(12) United States Patent
Buurlage et al.

(10) Patent No.: US 9,157,483 B2
(45) Date of Patent: Oct. 13, 2015

(54) CONNECTION BETWEEN A SHAFT AND A HUB COMPONENT AND METHOD OF PREPARING THE CONNECTION

(71) Applicant: MAXON MOTOR AG, Sachseln (CH)

(72) Inventors: Thorsten Buurlage, Gorxheimertal (DE); Michael Reith, Lörrach (DE)

(73) Assignee: MAXON MOTOR AG, Sachseln (CH)

( * ) Notice: Subject to any disclaimer, the term of this patent is extended or adjusted under 35 U.S.C. 154(b) by 0 days.

(21) Appl. No.: 13/628,755

(22) Filed: Sep. 27, 2012

(65) Prior Publication Data
US 2013/0084125 A1   Apr. 4, 2013

(30) Foreign Application Priority Data
Sep. 30, 2011   (EP) ..................................... 11007966

(51) Int. Cl.
| | | |
|---|---|---|
| F16D 1/068 | (2006.01) | |
| F16H 57/00 | (2012.01) | |
| C04B 37/02 | (2006.01) | |

(52) U.S. Cl.
CPC ............ *F16D 1/068* (2013.01); *C04B 37/026* (2013.01); *F16H 57/0025* (2013.01); *C04B 2237/12* (2013.01); *C04B 2237/348* (2013.01); *C04B 2237/406* (2013.01); *C04B 2237/765* (2013.01); *Y10T 403/35* (2015.01)

(58) Field of Classification Search
CPC .... C04B 37/02; C04B 37/023; C04B 37/026; F16D 1/06; F16D 1/068; F16D 1/067

USPC .......... 403/28–30, 265, 270–272; 29/525.14; 219/85.13, 85.15, 85.22, 121.64
See application file for complete search history.

(56) References Cited

U.S. PATENT DOCUMENTS

| | | | | |
|---|---|---|---|---|
| 3,367,696 A | * | 2/1968 | Langley | 403/270 |
| 3,385,618 A | * | 5/1968 | Hargis | 403/271 |
| 3,979,187 A | * | 9/1976 | Scherer | 403/179 |
| 4,214,906 A | * | 7/1980 | Langer et al. | 419/6 |
| 4,325,647 A | * | 4/1982 | Maier et al. | 403/29 |
| 4,362,471 A | * | 12/1982 | Langer et al. | 416/241 B |
| 4,518,315 A | * | 5/1985 | Kruger | 416/241 B |
| 4,562,121 A | | 12/1985 | Thiemann et al. | |

(Continued)

FOREIGN PATENT DOCUMENTS

| | | |
|---|---|---|
| DE | 33 45 219 C1 | 3/1985 |
| DE | 37 11 489 A1 | 10/1987 |

(Continued)

OTHER PUBLICATIONS

European Search Report issued on Feb. 8, 2012 for European Application No. 11007966.2.

(Continued)

*Primary Examiner* — Daniel Wiley
(74) *Attorney, Agent, or Firm* — Buchanan Ingersoll & Rooney PC

(57) ABSTRACT

A method of connecting a hub component and a connection between a shaft and a hub component, in particular a pinion connected to a shaft. The hub component and the shaft are formed of different materials, that is of ceramics and metal. A connecting element of metal is connected both to the hub component and to the shaft. The hub component and the shaft are connected to the connecting element by a material bond.

13 Claims, 3 Drawing Sheets

(56) References Cited

U.S. PATENT DOCUMENTS

Figure 1:
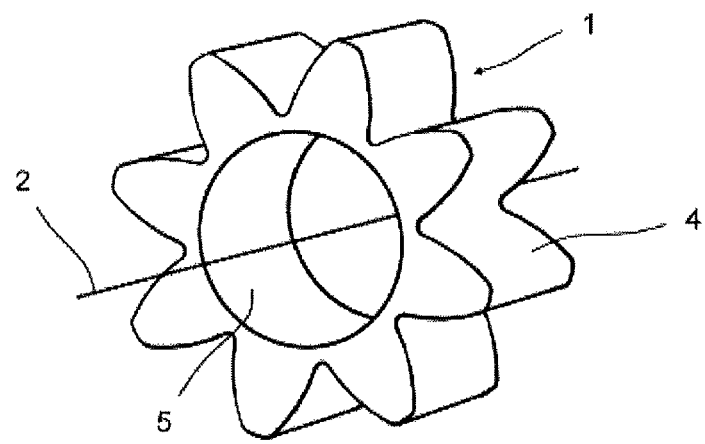

| | | | | |
|---|---|---|---|---|
| 4,643,648 | A * | 2/1987 | Huller | 416/241 B |
| 4,645,068 | A * | 2/1987 | Partz | 198/676 |
| 4,679,960 | A | 7/1987 | Mizuhara | |
| 4,722,630 | A * | 2/1988 | Fang | 403/30 |
| 4,723,863 | A * | 2/1988 | Takagi et al. | 403/272 |
| 4,740,429 | A * | 4/1988 | Tsuno | 428/627 |
| 4,747,722 | A * | 5/1988 | Kawaguchi et al. | 403/30 |
| 4,758,112 | A * | 7/1988 | Kawamura | 403/272 |
| 4,798,320 | A * | 1/1989 | Fang | 228/124.7 |
| 4,874,674 | A * | 10/1989 | Oda et al. | 428/469 |
| 4,984,927 | A * | 1/1991 | Kojima et al. | 403/30 |
| 5,028,162 | A * | 7/1991 | Tsuno et al. | 403/30 |
| 5,035,959 | A * | 7/1991 | Ito et al. | 428/627 |
| 5,073,085 | A * | 12/1991 | Ito et al. | 415/216.1 |
| 5,076,484 | A * | 12/1991 | Ito et al. | 228/124.7 |
| 5,104,747 | A * | 4/1992 | Makino et al. | 428/621 |
| 5,108,025 | A * | 4/1992 | Kang et al. | 228/124.7 |
| 5,129,784 | A * | 7/1992 | Yoshikawa et al. | 415/216.1 |
| 6,431,781 | B1 * | 8/2002 | Schenk | 403/29 |
| 6,672,786 | B2 * | 1/2004 | Schenk | 403/30 |
| 7,156,282 | B1 * | 1/2007 | Renaud et al. | 228/122.1 |
| 7,182,578 | B2 * | 2/2007 | Chou | 416/204 R |
| 7,857,194 | B2 * | 12/2010 | Kramer | 228/122.1 |
| 2006/0067824 | A1 * | 3/2006 | O'Hara | 416/170 R |
| 2007/0177937 | A1 | 8/2007 | Holowczak et al. | |
| 2010/0273570 | A1 * | 10/2010 | Ines et al. | 473/342 |

FOREIGN PATENT DOCUMENTS

| | | |
|---|---|---|
| DE | 199 32 939 A1 | 1/2001 |
| DE | 199 64 105 C1 | 8/2001 |
| EP | 0 038 072 A1 | 10/1981 |
| EP | 1 813 829 A2 | 8/2007 |
| JP | 09-272021 A | 10/1997 |
| JP | 2007-204361 A | 8/2007 |

OTHER PUBLICATIONS

Office Action (Notification of the Reasons for Rejection) issued on May 28, 2014, by the Korean Patent Office in corresponding Korean Patent Application No. 10-2012-0108611 and an English translation of the Office Action. (7 pages).

Office Action (Notification of the Reasons for Rejection) issued by the Korean Patent Office on Oct. 30, 2013 in corresponding Korean Patent Application No. 10-2012-0108611 and an English translation of the Official Action. (9 pages).

* cited by examiner

CONNECTION BETWEEN A SHAFT AND A HUB COMPONENT AND METHOD OF PREPARING THE CONNECTION

The present invention relates to a method of connecting a hub component, in particular a pinion, to a shaft and to a connection between a shaft and a hub component. The present invention furthermore relates to an electric miniature drive with a shaft and a pinion connected to the shaft.

From prior art, various methods of connecting a separately produced hub component, for example a gearwheel, a pinion or the like, to a shaft are known. In particular in electric motor construction, it is in many cases not possible or not suitable to connect the pinion of the motor shaft, which is necessary, for example, for driving a gear, in one piece to the shaft. In some cases, for example for assembly reasons, pinions cannot be connected to the motor shaft projecting from the electric motor casing before the whole electric motor component group is completed. Moreover, electric motors are often prefabricated without pinion and equipped with different pinions according to the customer's demands. Pinions or also other hub components are therefore usually made with a hub bore hole, placed onto the motor shaft for assembly, and connected to the shaft via an interference fit or other joining processes.

The separate manufacture and subsequent connection of the pinion or the hub component to the shaft can also be appropriate if the hub component and the shaft must meet different demands and are therefore suitably made of different materials.

A method or a connection of the generic type is known, for example, from DE 19964105 C1. The hub and the shaft can consist of different materials, that is steel and ceramics, and are connected to each other using a crimp sleeve or ferrule. The ferrule is disposed between the shaft and the hub, so that there is an interference fit each between the shaft and the ferrule and the ferrule and the hub. For a secure connection, the inner jacket of the ferrule in contact with the shaft as well as the outer jacket of the ferrule in contact with the hub is provided with a coating that increases the coefficient of friction.

A disadvantage of the connection known from DE 19964105 C1 consists in that an interference fit cannot produce an absolutely secure connection between the shaft and the hub, not even if a ferrule with a coating that increases the coefficient of friction is used. High forces acting upon the shaft or hub in the circumferential direction can thus lead to a twisting of the hub or the pinion with respect to the shaft. Moreover, the whole method, in particular the coating of the ferrule with substances that increase the coefficient of friction, are both complicated and expensive. If a ceramic pinion is to be connected to a shaft of metal, the transmittable forces quickly reach their limits in electric miniature motors and micromotors when an interference fit is used because the employed components, in particular the ceramic pinion, are sometimes of an extremely filigree design and thus there is a risk of the pinion being fissured while the compression joint is being prepared.

From DE 3711489 A1, an arrangement for fixing a metallic hub onto a shaft consisting of a ceramic material is known. Here, too, a sleeve is disposed between the shaft and the hub, the sleeve being connected each to the shaft and the hub, respectively. The sleeve is soldered with the ceramic shaft, while there is an axial clamping fit between the hub and the sleeve. Therefore, the design of the sleeve is relatively complicated and comprises an axial stop for the hub component and a thread into which a straining screw can be screwed for clamping the hub component. Instead of the axial interference fit, there can also be a tight fit between the hub and the sleeve.

The clamping or tight fit described in DE 3711489 A1 involves the disadvantages already described above. For producing a form fit, the design of the geometry of the sleeve and the hub component must be very complicated.

It is therefore the object of the present invention to further develop the method of the generic type such that a secure connection between the pinion or the hub component, respectively, and the shaft is ensured. The method should moreover be inexpensive and easy to perform.

Accordingly, one obtains an inventive solution to the problem if the hub component and the shaft are connected to the connecting element consisting of metal by a material bond.

By this, an absolutely secure connection between the shaft and the hub component is achieved. The method is moreover very inexpensive and easy to perform. One can do without special complicated geometry designs for form fit connections. The method is suited both for connecting a ceramic hub component, for example a pinion, to a shaft of metal and for connecting a metallic hub component to a ceramic shaft.

Advantageous embodiments of the method according to the invention are the subject matter of subclaims.

A very good connection between the component of ceramics and the connecting element of metal by a material bond is achieved if the component consisting of ceramics is soldered to the connecting element. Soldering is moreover easy and reproducible and can be done, for example, in a soldering furnace.

It showed to be particularly advantageous to weld the component consisting of metal to the connecting element. Welding is done particularly quickly, easily and inexpensively by means of laser welding. The low heat generation in laser welding furthermore prevents soldering joints of previously soldered components from being opened by melting the solder. This risk, however, is given in most of the other welding methods. To furthermore reduce the risk of opening a soldering joint, it is advantageous to weld by spot welding.

In a particularly preferred embodiment of the present invention, the connecting element is first connected to the hub component and subsequently to the shaft. This has the advantage that the completed unit consisting of the hub component and the connecting element can be exactly positioned with the shaft and in particular oriented in the circumferential direction before it is finally connected.

The invention furthermore provides a connection between a shaft and a hub component, the connection being prepared according to the inventive method.

In a particularly preferred embodiment of the present invention, the connecting element between the shaft and the hub component is a sleeve radially disposed between the shaft and the hub component. Such a sleeve guarantees an optimal connection between the shaft and the hub component. The sleeve can be simply slipped onto the shaft or inserted into a hub bore hole of the hub component.

An optimal material connection between the sleeve and the component consisting of ceramics by means of soldering, or between the sleeve and the component consisting of metal by means of welding, is achieved if the sleeve consists of steel.

In a particularly preferred embodiment of the present invention, the hub component consists of ceramics and the shaft consists of steel. In this way, ceramic pinions can be employed using conventional shafts of steel. Ceramic pinions offer good sliding properties, less wear compared to metallic pinions, a higher service life and the advantage of an electric and thermal insulation. An advantage of using ceramics is also the biocompatibility of this material which is required in some applications.

It showed to be particularly advantageous for the hub component to consist of zirconium oxide. Zirconium oxide can be particularly well soldered with metallic materials.

The method according to the invention and the connection between shaft and pinion according to the invention are particularly suited in electric miniature drives. These include mere electric motors as well as drive units consisting of an electric miniature motor and a transmission. In the latter case, the invention can be employed both for connecting the gear's output shaft with the output pinion and for connecting the motor shaft with the motor pinion.

One embodiment of the present invention will be illustrated more in detail below with reference to drawings.

Figure 2:
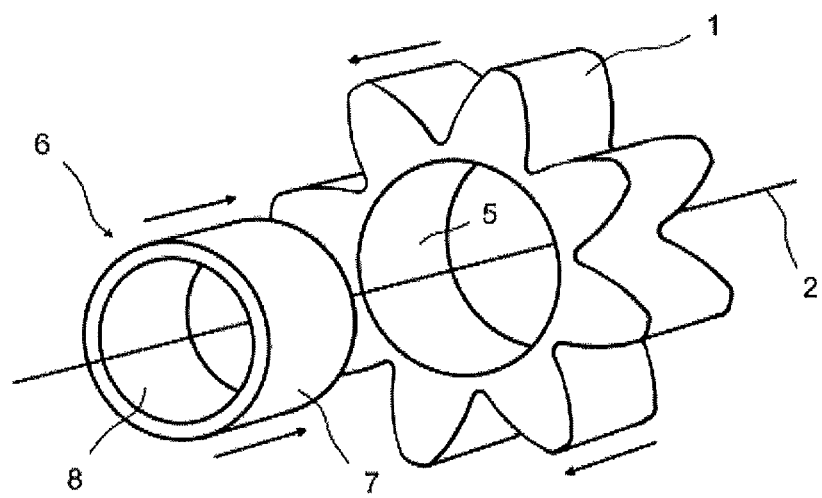
Figure 3:
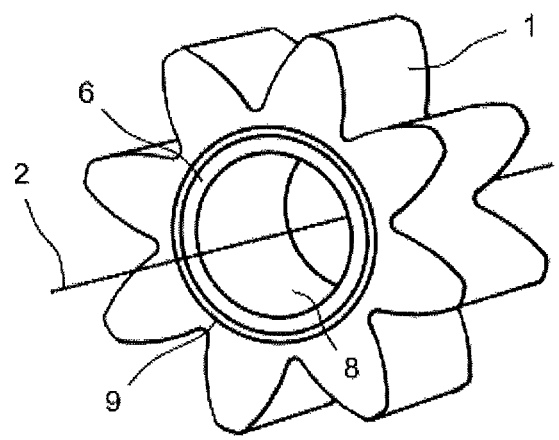
Figure 4:
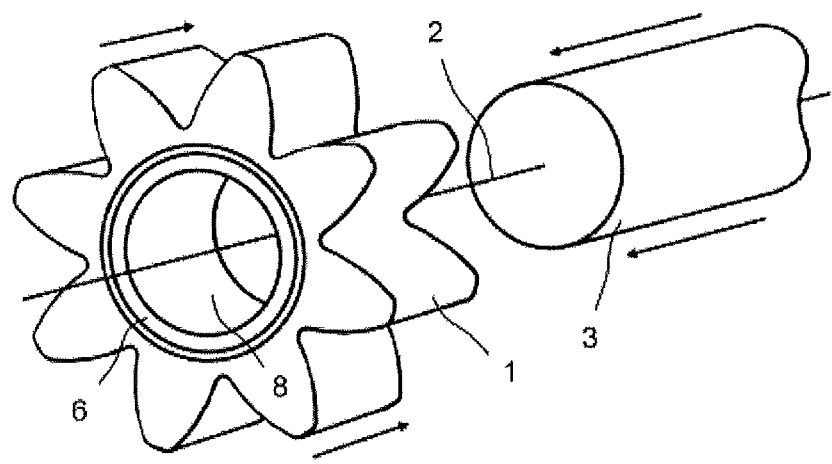
Figure 5:
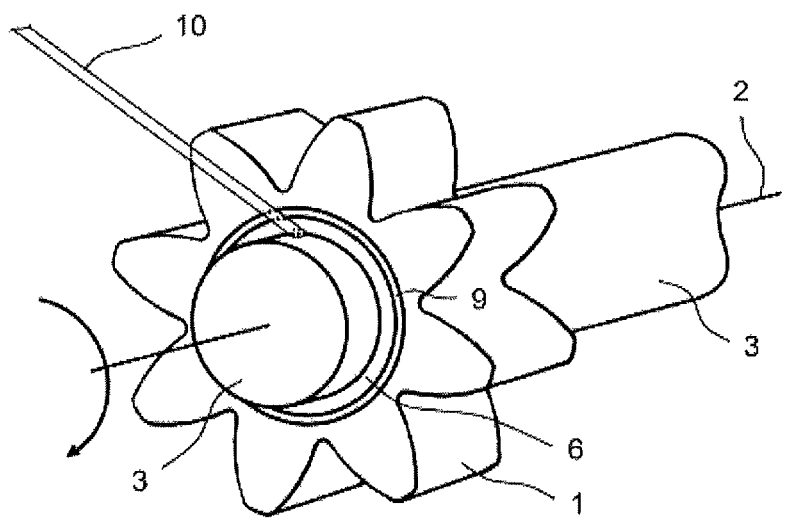
Figure 6:
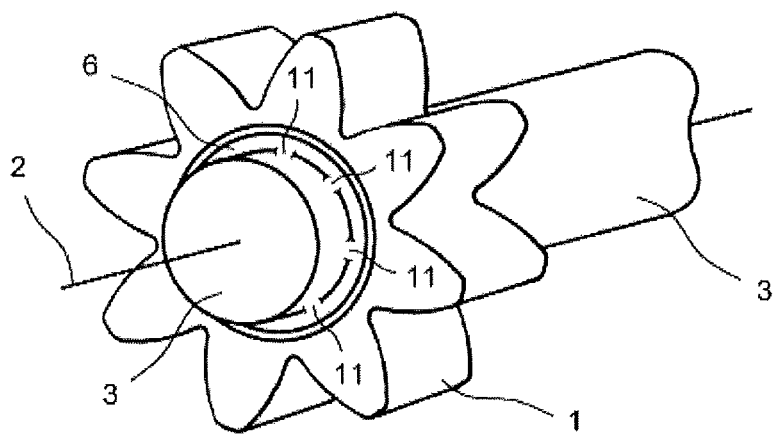

In the drawings:

FIG. 1 shows a ceramic pinion in an oblique view,

FIG. 2 shows a first procedure step of the method according to the invention, wherein a hollow cylindrical sleeve is inserted into the ceramic pinion according to FIG. 1, FIG. 3 shows the ceramic pinion of FIGS. 1 and 2 with an inserted and already soldered steel sleeve, FIG. 4 shows a further procedure step of the method according to the invention, wherein the prefabricated pinion of FIG. 3 is put onto a steel shaft, FIG. 5 shows a further procedure step, wherein the steel sleeve of the prefabricated pinion is welded with the steel shaft, and FIG. 6 shows the pinion finally connected to the steel shaft.

In the following description, equal parts are provided with equal reference numerals. If a figure contains reference numerals which are not explained in the pertaining description of the figures, reference is made to previous descriptions of the figures.

The present invention permits the connection of a pinion of ceramics to a conventional shaft of steel. The use of ceramic materials in motor pinions offers good sliding properties, less wear compared to metallic pinions, a higher service life and the advantage of electric and thermal insulation. The invention moreover offers the advantage of a secure connection between the pinion and the shaft.

Such a ceramic pinion is shown in FIG. 1. The pinion 1 is shown in an oblique view and comprises a gear ring 4 and a centrical bore whose inner cylinder surface area is marked with reference numeral 5. The axis of the ceramic pinion 1 is furthermore marked with reference numeral 2.

To be able to connect the ceramic pinion with a shaft of metal, in particular of steel, in a first procedure step of the method according to the invention, a hollow cylindrical steel sleeve 6 is first inserted into the central bore of the pinion. This procedure step is represented in FIG. 2. The hollow cylindrical sleeve 6 comprises an outer surface area 7 and an inner surface area 8. The diameter of the outer surface area 7 is dimensioned such that the hollow cylindrical sleeve 6 can be inserted into the central bore of the ceramic pinion 1 with a clearance. Preferably, the length of the hollow cylindrical sleeve 6 corresponds to the axial length of the ceramic pinion 1.

In FIG. 3, the ceramic pinion is shown with the hollow cylindrical steel sleeve 6 being completely inserted. The hollow cylindrical sleeve 6 is soldered to the ceramic pinion, so that a connecting solder layer 9 is formed between the outer surface area 7 of the hollow cylindrical sleeve 6 and the inner cylinder surface area 5 of the central bore of the ceramic pinion 1. The soldering process of the two components can be done, for example, in a furnace. The pinion with the inserted and soldered steel sleeve 6 prefabricated in this manner can now be put, just like a conventional pinion of metal or steel, onto a shaft 3 also consisting of metal or steel and connected to it. This process is shown in FIG. 4. The prefabrication of the pinion by inserting and soldering the hollow cylindrical sleeve 6 offers the advantage that the prefabricated pinion can now be exactly positioned and oriented on the shaft 3.

In a next procedure step, the pinion 1 or the sleeve 6 soldered to the pinion and the steel shaft 3 are welded to each other. Welding is done by means of a laser welding process. For this, the laser beam 10 of the laser welding set not shown in further detail is directed to the connecting joint between the cylindrical shaft 3 and the face of the sleeve 6 of the pinion 1. Welding can be done by spot welding, so that the welding points 11 circumferentially distributed and represented in FIG. 6 are formed. As an alternative, a continuous weld seam can be prepared in the circumferential direction by the laser 10. As required, the pinion can also be welded to the cylindrical shaft 3 on the rear side which is not shown.

The laser welding process is particularly suited for welding the hollow cylindrical sleeve 6 to the cylindrical shaft 3 because there is a relatively low heat transfer into the sleeve and, as a consequence, into the joint 9 between the sleeve and the pinion. Compared to other welding processes, it is thus ensured by the laser welding process that the joint 9 between the sleeve 6 and the pinion 1 is not heated to such an extent that the solder melts and the joint is opened by the welding process. By the above described spot welding, the joint is heated very moderately. The diameter of the inner surface area 8 of the hollow cylindrical sleeve 6 and the diameter of the cylindrical shaft 3 can be coordinated such that either a clearance fit or an interference fit exists between the two components. With an interference fit, the connection between the pinion and the shaft produced by welding can be supported. As in this case, the interference fit only has a supporting effect, the interference fit can be designed such that only small stresses occur which would never lead to a destruction of the ceramic pinion.

It will be understood that the pinion does not have to be completely slipped onto the shaft 3, as is shown in FIGS. 5 and 6. For example, the face of the cylindrical shaft 3 and the front face of the pinion can be flush. It is furthermore pointed out that only the front end of the cylindrical shaft 3 is shown.

The invention is particularly suited for the connection of the pinion and the motor or gear shaft of an electric miniature drive.

The invention claimed is:

1. A method for connecting a ceramic hub component to a metal shaft, wherein the hub component comprises a through-hole, the method comprising:
    connecting a metal connecting element to both the ceramic hub component and the metal shaft, through a material bond wherein the connecting element is first connected to the hub component and subsequently welded to the shaft, and wherein the welding is done by laser welding, wherein the connecting element is a solid, hollow cylinder radially disposed between the metal shaft and the ceramic hub component.

2. A method according to claim 1, wherein the ceramic hub component is soldered to the connecting element.

3. A connection between a metal shaft and a ceramic hub component, prepared according to the method according to claim 2.

4. A connection according to claim 3, wherein the metal shaft consists of steel.

5. A connection between a metal shaft and a ceramic hub component, prepared according to the method according to claim 1.

6. A connection according to claim 5, wherein the connecting element consists of steel.

7. A connection according to claim 6, wherein the metal shaft consists of steel.

8. A connection according to claim 6, wherein the ceramic hub component consists of zirconium oxide.

9. A connection according to claim 5, wherein the metal shaft consists of steel.

10. A connection according to claim 5, wherein the ceramic hub component consists of zirconium oxide.

11. An electric miniature drive with a metal shaft and a ceramic pinion connected to the metal shaft, comprising:
   a connection between the metal shaft and the ceramic pinion according to claim 5.

12. A connection according to claim 3, wherein the ceramic hub component consists of zirconium oxide.

13. The method according to claim 1, wherein the ceramic hub component has an inner cylindrical surface area defined by first and second ends, the connecting element being arranged in the inner cylindrical surface area and having first and second ends which are co-planar with the first and second ends of the ceramic hub component.

\* \* \* \* \*